United States Patent
Shimazu

(10) Patent No.: US 8,082,757 B2
(45) Date of Patent: Dec. 27, 2011

(54) FLUID-COOLED MOLD

(75) Inventor: Atsushi Shimazu, Akita (JP)

(73) Assignee: Japan Super Quartz Corporation, Akita-shi (JP)

( * ) Notice: Subject to any disclaimer, the term of this patent is extended or adjusted under 35 U.S.C. 154(b) by 298 days.

(21) Appl. No.: 12/493,070

(22) Filed: Jun. 26, 2009

(65) Prior Publication Data

US 2010/0162767 A1   Jul. 1, 2010

(30) Foreign Application Priority Data

Jun. 28, 2008 (JP) .................. 2008-169702
Jun. 12, 2009 (JP) .................. 2009-141301

(51) Int. Cl.
*C03B 5/23* (2006.01)
(52) U.S. Cl. ........................................ 65/356
(58) Field of Classification Search ............ 65/348, 65/355, 356, 374.15; 373/27, 30, 44, 45, 373/71, 72, 75, 76, 163, 122
See application file for complete search history.

(56) References Cited

U.S. PATENT DOCUMENTS 3,358,067 A * 12/1967 Dillon et al. ............ 373/88
4,416,680 A   11/1983 Brüning
6,090,342 A *  7/2000 Sumigama et al. ....... 266/193

FOREIGN PATENT DOCUMENTS

| CN | 2656436 Y | 11/2004 |
| JP | 11-043394 A | 2/1999 |
| JP | 2000-219524 A | 8/2000 |
| JP | 2000219524 | * 8/2000 |
| JP | 2002-154890 A | 5/2002 |
| JP | 2004-026609 A | 1/2004 |
| JP | 2004026609 | * 1/2004 |
| JP | 2004155642 A | * 6/2004 |
| SU | 1027490 | * 7/1983 |

OTHER PUBLICATIONS

JP 2004-155642(Machine Translation) [online], [retrieved on Jun. 7, 2011], retrieved from PAJ Database (http://www19.ipdl.inpit.go.jp/PA1/cgi-bin/PA1INDEX).*
SU 1027490 (Abstract Translation) [online], [retrieved on Jun. 7, 2011], retrieved from DERWENT Database.*
JP 2000219524 (Machine Translation) [online], [retrieved on Oct. 27, 2011], retrieved from PAJ Database (http://www19.ipdl.inpit.go.jp/PA1/cgi-bin/PA1INDEX).*
JP 2004026609 (Machine Translation) [online], [retrieved on Oct. 27, 2011], retrieved from PAJ Database (http://www19.ipdl.inpit.go.jp/PA1/cgi-bin/PA1INDEX).*
Korean Office Action mailed Jun. 16, 2011, issued in corresponding Korean Application No. Oct. 2009-0058048.
Office Action mailed Apr. 21, 2011, issued in corresponding Chinese Application No. 200910142295.5, filed Jun. 29, 2009, 16 pages.

* cited by examiner

*Primary Examiner* — Matthew Daniels
*Assistant Examiner* — Yana Belyaev
(74) *Attorney, Agent, or Firm* — Christensen O'Connor Johnson Kindness PLLC

(57) ABSTRACT

A fluid-cooled mold for the production of a quartz crucible provided in its interior with a space for flowing of cooling fluid comprises an outer mold section made from a heat-conductive metal or alloy material and an inner mold section closely arranged to an inner surface of the outer mold section and made from a heat-resistant material.

3 Claims, 4 Drawing Sheets

FLUID-COOLED MOLD

BACKGROUND

1. Field of the Invention

This invention relates to a fluid-cooled mold for use in the production of a quartz crucible, and more particularly to a fluid-cooled mold having an optimized mold structure.

2. Description of the Related Art

A quartz glass crucible is used for pulling a silicon single crystal as a semiconductor material, a silicon crystal as a solar battery material or the like. For example, the silicon single crystal is mainly produced by a method in which a polycrystalline silicon lump charged in the quartz glass crucible is melted by heating to form a silicon melt and then a seed crystal is immersed in the silicon melt and pulled therefrom. The silicon crystal as a solar battery material is low in single-crystallinity as compared with single silicon crystal as a semiconductor material, but is produced by the same pulling method.

As a method of producing a quartz glass crucible is known a rotating mold method. In this method, a rotatable bowl-shaped mold is used, and raw quartz powder is deposited on an inner surface of the mold at a given thickness along the inner surface by utilizing centrifugal force generated during the rotation of the mold. Subsequently, the quartz powder is melted and vitrified by heating to a temperature (about 2000° C.) higher than a melting point (melting temperature) through arc discharge of an electrode(s) disposed above the mold and around the rotation central axis of the mold to form a glass crucible having a form along the inner surface of the mold, and thereafter the resulting glass crucible is cooled and taken out from the mold.

A fluid-cooled mold has hitherto been known as a mold used for producing the quartz glass crucible by the rotating mold method. For example, JP-A-H11-43394 discloses that raw quartz powder is charged into a rotating stainless-steel fluid-cooled mold and melted through arc discharge to produce a quartz glass crucible. Similarly, JP-A-2002-154890 discloses that quartz powder is charged into a rotating stainless-steel fluid-cooled mold and shaped through arc discharge under a reduced pressure to produce a quartz glass crucible.

In the conventional stainless-steel fluid-cooled mold, the heat damage of the mold is prevented by forming a space for flowing of a cooling fluid inside a bottom portion and peripheral wall portion of the mold and cooling the bottom portion and peripheral wall portion of the mold with the cooling fluid under an environment by heating at a higher temperature. The inner surface of the mold is usually cooled down to about 100° C. On the other hand, the raw quartz powder deposited on the inner surface of the mold is melted and vitrified by heating to a temperature above the melting point through arc discharge.

In the cooling structure of the conventional fluid-cooled mold, the quartz powder deposited on the inner surface of the mold is melted and vitrified by heating above the melting point at an outer surface side opposite to the inner surface of the mold, while a large portion of the quartz powder located at the inner surface side of the mold remains at an unmelted state without vitrification because heat in such a portion is removed by the cooling of the mold. In order to form a vitrified layer having a target thickness with the conventional fluid-cooling mold, the quartz powder is used in a quantity larger by about 2 times than the weight required for target thickness. Therefore, there is a problem that the quantity of quartz powder for the formation of a product is small as compared with the quantity used and the loss in the quantity of the quartz powder is large.

On the other hand, there is known a carbon mold, the whole portion of which is made of carbon. Although carbon is high in heat resistance as compared with stainless steel, it is subjected to heat damage due to oxidative consumption if used at a high temperature for an extended period of time. There is a problem that the heat-damaged mold causes failures in the shape of the quartz glass crucible and thus the whole of the expensive mold is replaced with a new mold, which significantly reduces the economic efficiency.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention is to solve the aforementioned problems in the conventional fluid-cooled mold, and provides a fluid-cooled mold having sufficient heat resistance and significantly reducing unmelted portions of raw quartz powder by optimizing the structure of the fluid-cooled mold.

The invention provides a fluid-cooled mold having the following construction:

(1) A fluid-cooled mold for the production of a quartz crucible provided in its interior with a space for flowing of a cooling fluid, which comprises an outer mold section made from a heat-conductive metal or alloy material and an inner mold section closely arranged to an inner surface of the outer mold section and made from a heat-resistant material.

(2) A fluid-cooled mold according to the item (1), wherein vent-holes opening to an inner surface of the mold are formed in the inner mold section.

(3) A fluid-cooled mold according to the item (1) or (2), wherein the inner mold section is integrally constituted with a plurality of split segments comprising a dish-shaped lower split segment placed on a bottom portion of the outer mold section and at least one ring-shaped upper split segment detachably piled on the lower split segment and closely arranged to an inner surface of the outer mold section.

(4) A fluid-cooled mold according to the item (3), wherein each of the plural split segments is made from a carbon material.

(5) A fluid-cooled mold according to the item (1), wherein the outer mold section is constituted as a fluid-cooling jacket.

(6) A fluid-cooled mold according to the item (1), wherein the mold has a bottomed cylindrical shape with an upward opening portion and is used for producing a quartz crucible by a rotating mold method in which the mold is rotated around a virtual line passing from a central position of the bottom portion to a central position of the opening portion as an axis of rotation.

The fluid-cooled mold according to the invention is a mold for the production of a quartz crucible, in which the outer mold section constituting the mold is provided in its interior with a space for flowing of a cooling fluid and made from a heat-conductive metal or alloy material and the inner mold section is closely arranged to the inner surface of the outer mold section and made from a heat-resistant material, so that raw quartz powder does not directly contact with the inner surface of the outer mold section. Therefore, even if the mold is cooled by the outer mold section during the heating at a higher temperature, the removal of heat from the heated raw quartz powder through the inner surface of the mold is made less by the heat insulating effect of the inner mold section made from the heat-resistant material, and hence the quantity of the raw quartz powder retained at an unmelted state is reduced significantly.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

The invention will be described with reference to the accompanying drawings, wherein.

DETAILED DESCRIPTION

While illustrative embodiments have been illustrated and described, it will be appreciated that various changes can be made therein without departing from the spirit and scope of the invention.

Figure 1:
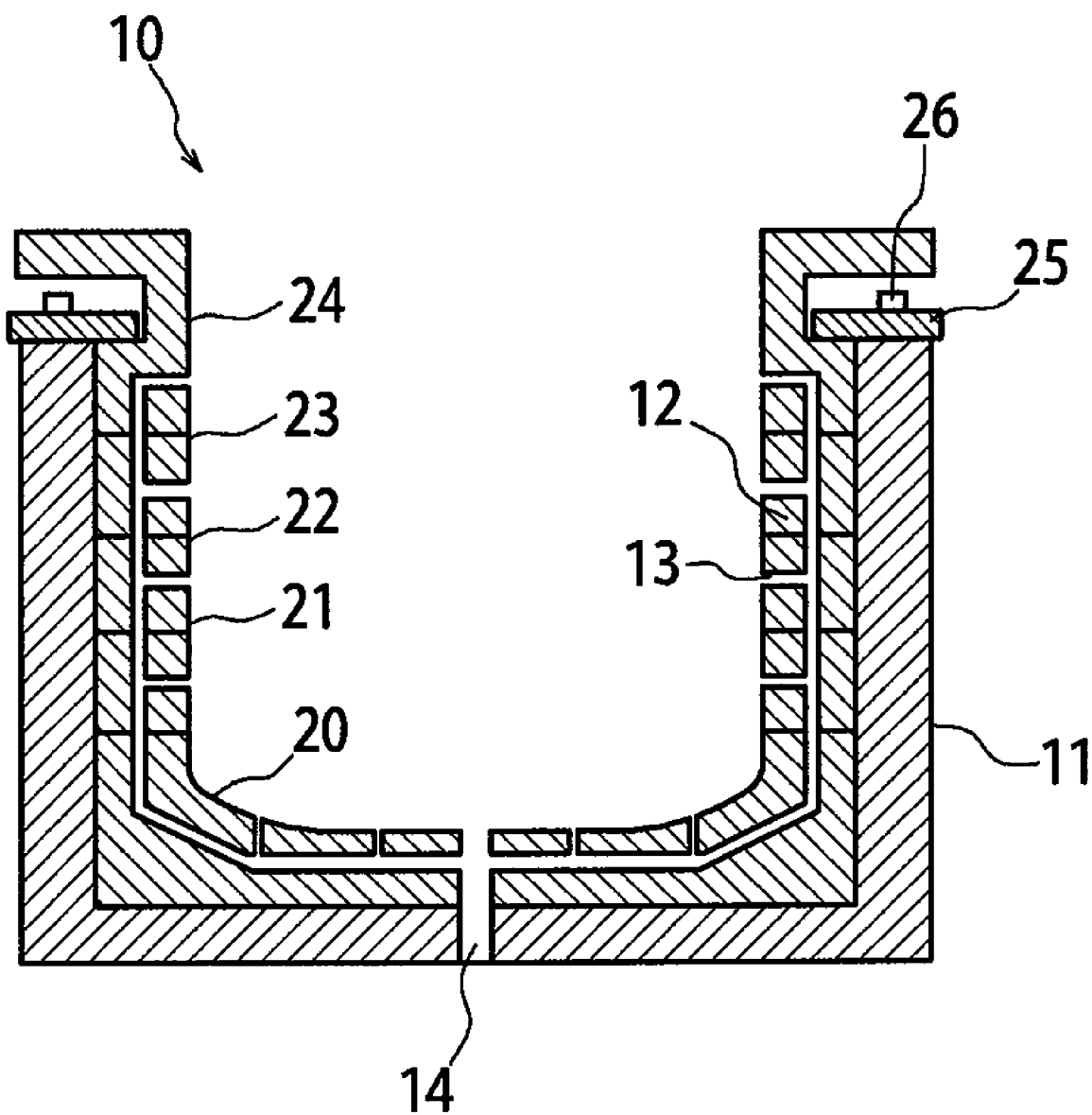
FIG. 1 is a longitudinal sectional view of a fluid-cooled mold according to the invention.

In FIG. 1 is shown a typical construction example of the fluid-cooled mold according to the invention. Any fluid known to those of skill in the art can be used in the disclosed embodiments. In one embodiment, the fluid is water.

The illustrated fluid-cooled mold 10 is a fluid-cooled mold for the production of a quartz crucible and comprises mainly an outer mold section 11 and an inner mold section 12.

The outer mold section 11 is provided in its interior with a space for flowing of a cooling fluid and made from a heat-conductive metal or alloy material, and there is mentioned a fluid-cooling jacket as an example thereof. As a material of the outer mold section 11 is preferable a heat-conductive and corrosion-resistant metal or alloy material having an excellent cooling ability, which includes, for example, austenitic stainless steel, atmosphere corrosion resisting steel, titanium and the like.

The inner mold section 12 is closely arranged to the inner surface of the outer mold section and made from a heat-resistant material such as carbon material, which constitutes the fluid-cooled mold 10 integrally with the outer mold section 11. Moreover, the fluid-cooled mold 10 has a bottomed cylindrical shape with an upward opening portion and is used for producing a quartz crucible by a rotating mold method in which the mold is rotated around a virtual line passing from a central position of the bottom portion to a central position of the opening portion as an axis of rotation.

The fluid-cooling jacket constituting the outer mold section 11 is made of stainless steel in which a space for flowing and/or circulating a cooling fluid is formed inside the jacket and connected to a means (not shown) for feeding the cooling fluid to the space. To the entire inner surface of the outer mold section 11 is closely and integrally arranged the inner mold section 12 made from a heat-resistant material such as carbon material, for example, a carbon lining.

In the interior of the inner mold section 12 are formed a plurality of vent-holes 13 opening to the lining surface. These vent-holes 13 are communicated with a collective hole 14 formed at a bottom portion of the mold corresponding to the axis of rotation, and connected to an external pressure reduction device (not shown) through the collective hole 14. Air inside a raw quartz powder layer deposited on the inner surface of the inner mold section 12 is drawn through the vent-holes 13 toward exterior to hold the raw quartz powder layer at a pressure-reduced state. By removing air existent in the raw quartz powder layer through suction during the heat-melting is prevented retention of inner air bubbles in the vitrification of the quartz powder, whereby a transparent glass layer substantially containing no air bubble can be formed.

The inner mold section 12 constituting the fluid-cooled mold 10 may be detachably made of plural split segments 20 to 24. For example, the fluid-cooled mold 10 shown in FIG. 1 is integrally constituted with a dish-shaped lower split segment 20 placed on the bottom portion of the outer mold section 11 and at least one ring-shaped upper split segment detachably piled on the lower split segment 20 and closely arranged to the inner surface of the outer mold section 11, four upper split segments 21 to 24 in FIG. 1. These split segments 20 to 24 form the inner mold section 12 covering the inner surface of the outer mold section 11.

In the dish-shaped lower split segment 20 are formed a plurality of vent-holes 13 passing through the interior and opening at the bottom to the inner surface of the mold, and a collective hole 14 communicating to exterior at a center of the bottom portion. Also, the upper split segments 21 to 23 are ring-shaped members having the same inner and outer diameters, each of which segments is provided with a vent-hole 13 passing from an upper surface to a lower surface and opening to the inner surface of the mold. The uppermost split segment 24 is a ring-shaped member having the same inner diameter as the other upper split segments 21 to 23 and a U-shaped cross section and provided in its interior with a vent-hole 13. The uppermost split segment 24 is fixed to an upper end of the outer mold section 11 through fixing means such as a fixing member 25 engaging with an outwardly opened recess portion of the segment, a bolt 26 and the like. The dish-shaped lower split segment 20 and the upper split segments 21 to 24 are integrally fixed to each other by the fixing means, and detachably attached to the inner surface of the outer mold section 11.

Thus, the inner mold section 12 is constructed by assembling the plural split segments 20 to 24, whereby the inner mold section can be easily attached to the inner surface of the outer mold section 11. Also, since the inner mold section 12 is detachably attached to the outer mold section, if the inner mold section 12 is subjected to heat damage, it can be easily replaced with a new inner mold section. Among the split segments 20 to 24, only a heat-damaged split segment can be partially replaced with a new segment, so that the mold maintenance cost can be kept down but also the service life of the fluid-cooled mold as a whole can be largely improved.

Figure 2:
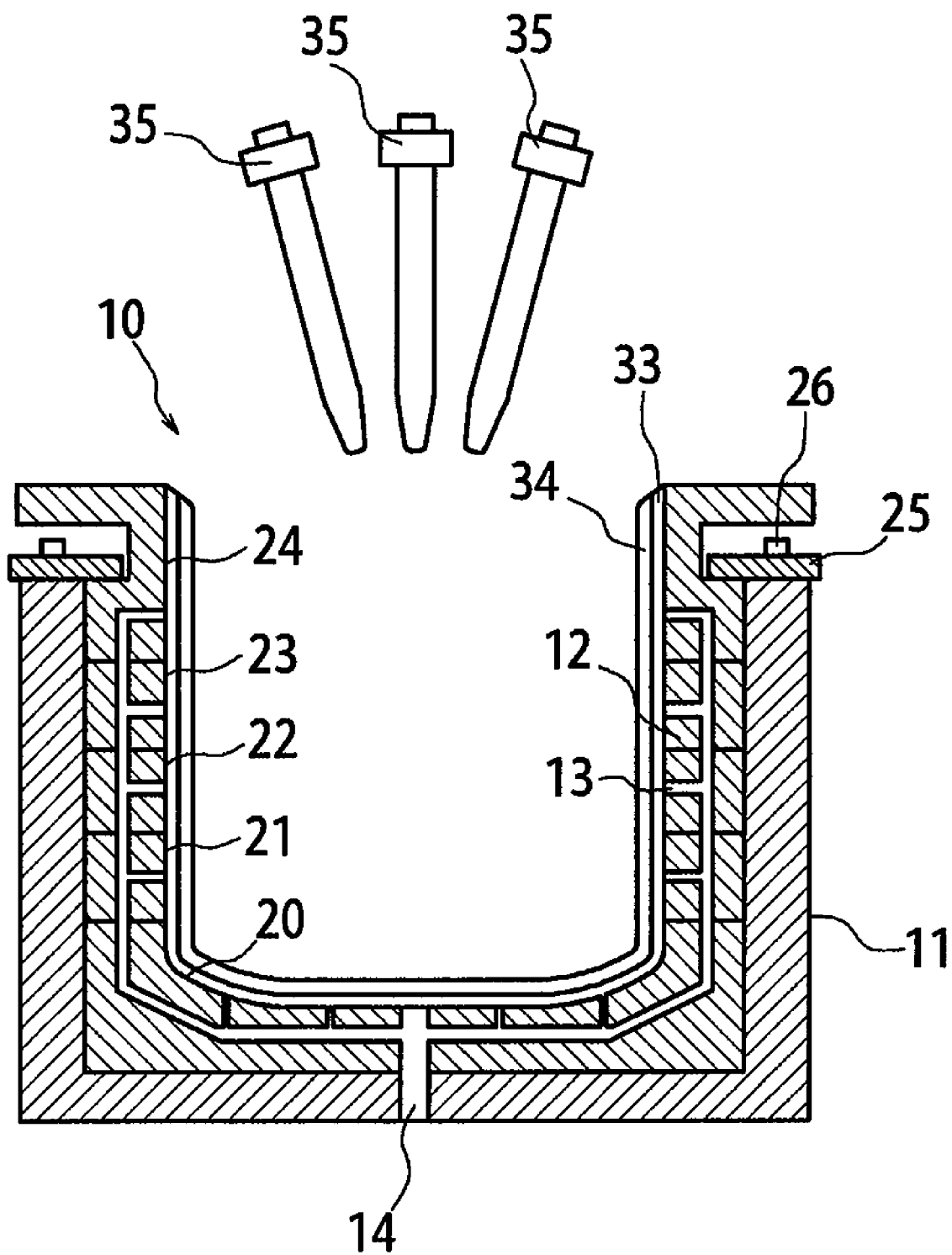
FIG. 2 is a cross-sectional view illustrating the production of a crucible by a rotating mold method.

As shown in FIG. 2, the fluid-cooled mold 10 according to the invention has a bottomed cylindrical shape with an upward opening portion and is rotated around a virtual line passing from a central position of the bottom portion to a central position of the opening portion as an axis of rotation to generate centrifugal force, whereby raw quartz powder is deposited on the inner surface of the inner mold section 12 at a given thickness by the rotating mold method. Subsequently, the raw quartz powder is melted by heating to a temperature above a melting point (about 2000° C.) through arc discharge of electrodes 35 disposed above the mold 10 and around the rotation central axis of the mold to form a melted quartz layer 34.

Figure 3A:
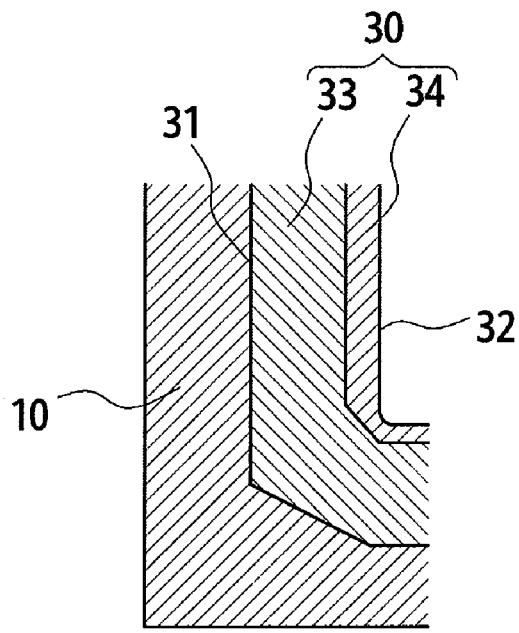
FIG. 3A is a cross-sectional view showing a state of heating raw quartz powder when a quartz crucible is produced using a conventional fluid-cooled mold.
Figure 3B:
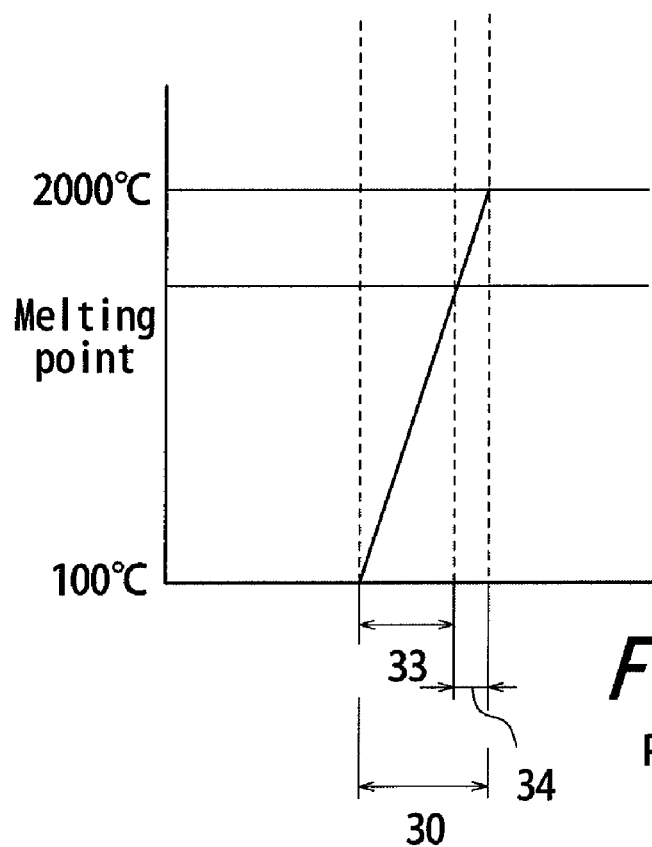
FIG. 3B is a graph illustrating the temperature of the parts of the quartz crucible production illustrated in FIG. 3A.

As shown in FIG. 3A, the conventional fluid-cooled mold is not provided with the inner mold section, so that the raw quartz powder is directly deposited on an inner surface 31 of the fluid-cooled mold 10 at the step of heat-melting the quartz powder. The inner surface 31 of the fluid-cooled mold is cooled to about 100° C., while the inner surface 32 of the resulting quartz layer 30 is heated to a temperature higher than a melting point (about 2000° C.), as illustrated in FIG. 3B. However, since the thermal conductivity of the quartz layer 30 is small, a large temperature gradient occurs in the interior of the quartz layer 30 ranging from the inner surface 32 of the quartz layer 30 to the inner surface 31 of the fluid-cooled mold 10. As a result, a portion of the deposited quartz layer corresponding to a temperature region of not higher than the melting point increases, and hence a ratio of an unmelted quartz layer 33 occupied in the quartz layer 30 becomes large. In order to form the melted quartz layer having a target thickness, therefore, it is necessary to deposit the raw quartz powder at a thickness taking account of the unmelted quartz layer 33.

Figure 4A:
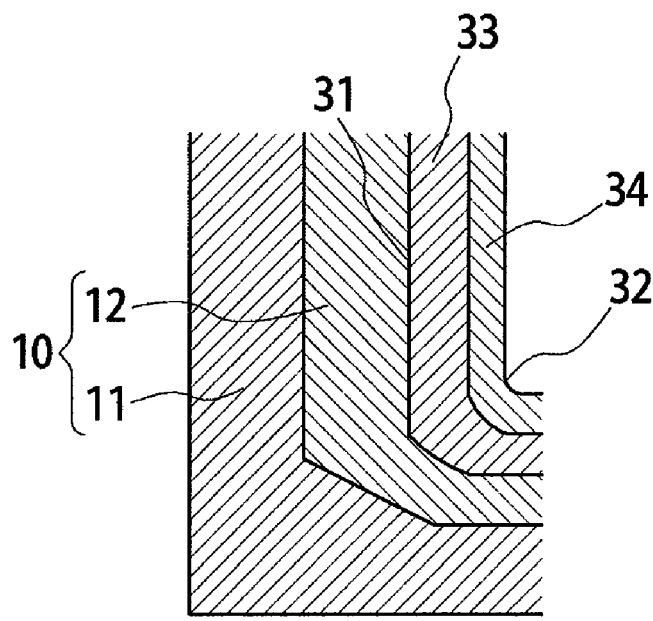
FIG. 4A is a cross-sectional view showing a state of heating raw quartz powder when a quartz crucible is produced using the fluid-cooled mold according to the invention.
Figure 4B:
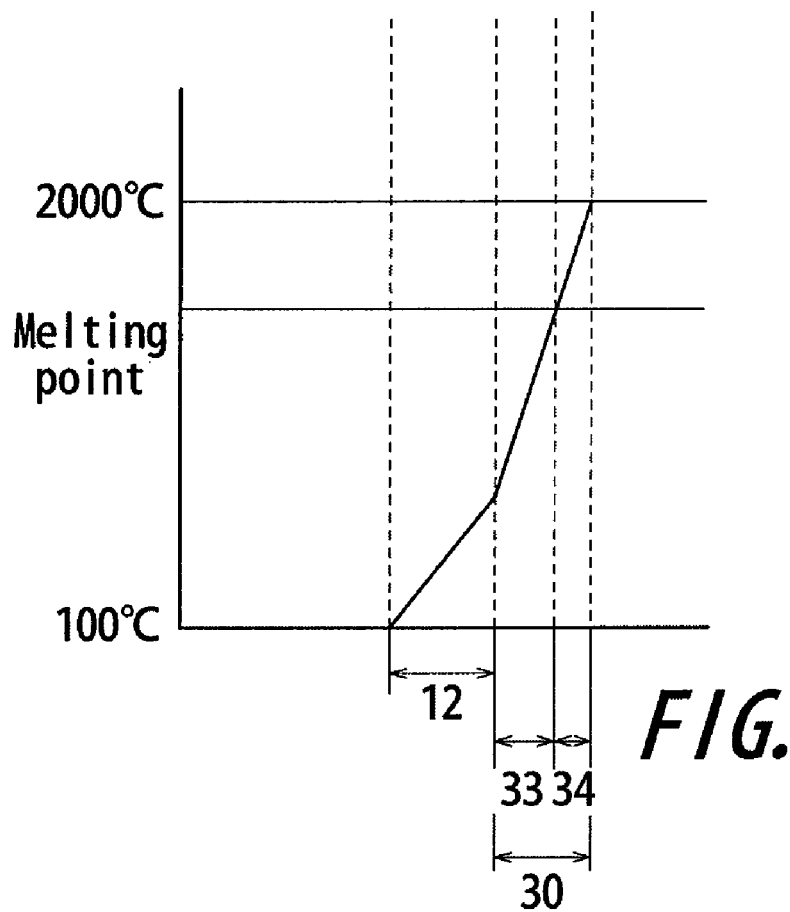
FIG. 4B. is a graph illustrating the temperature of the parts of the quartz crucible production illustrated in FIG. 4A.

On the contrary, when the fluid-cooled mold 10 comprising the outer mold section 11 and the inner mold section 12 according to the invention is used, as shown in FIG. 4A, the raw quartz powder is deposited on the inner surface of the inner mold section 12 and does not directly contact with the inner surface of the outer mold section 11. Owing to the presence of the inner mold section 12, the temperature of the quartz layer deposited on the inner surface of the inner mold section 12 can be kept high (as illustrated in FIG. 4B), whereby the thickness of the unmelted quartz layer 33 left in the quartz layer 30 can be largely reduced.

The invention claimed is:

1. A fluid-cooled mold for the production of a quartz crucible provided in its interior with a space for flowing of a cooling fluid, which comprises an outer mold section constituted as a fluid-cooling jacket made from a heat-conductive metal or alloy material and an inner mold section closely arranged to an inner surface of the outer mold section and made from a heat-resistant material, wherein the inner mold section is integrally constituted with a plurality of split segments made from a carbon material comprising a dish-shaped lower split segment in contact with a bottom portion of the outer mold section and at least one ring-shaped upper split segment detachably piled on the dish-shaped lower split segment and closely arranged to an inner surface of the outer mold section.

2. A fluid-cooled mold according to claim 1, wherein vent-holes opening to an inner surface of the mold are formed in the inner mold section.

3. A fluid-cooled mold according to claim 1, wherein the mold has a bottomed cylindrical shape with an upward opening portion and is used for producing a quartz crucible by a rotating mold method in which the mold is rotated around a virtual line passing from a central position of the bottom portion to a central position of the opening portion as an axis of rotation.

* * * * *